Figure 1:
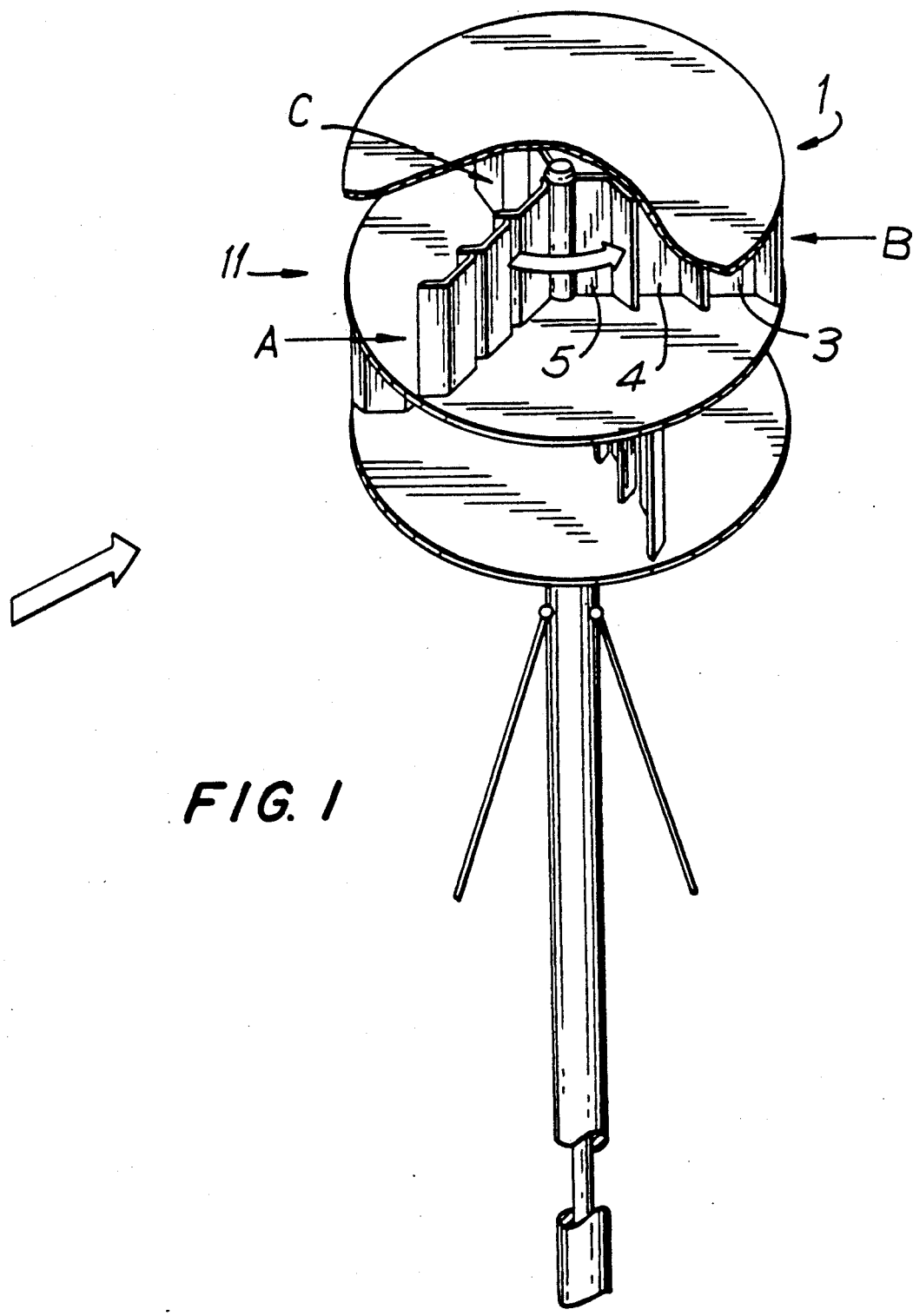

United States Patent [19]

Wilhelm

[11] Patent Number: 5,044,878

[45] Date of Patent: Sep. 3, 1991

[54] WIND POWER ENGINE

[76] Inventor: Alfred Wilhelm, Artilleriestrasse 36C, D-5000 Koeln 90, Fed. Rep. of Germany

[21] Appl. No.: 328,585

[22] PCT Filed: Jun. 9, 1988

[86] PCT No.: PCT/EP88/00507

§ 371 Date:

§ 102(e) Date:

[87] PCT Pub. No.: 988

PCT Pub. Date:

[30] Foreign Application Priority Data

Jun. 10, 1987 [DE] Fed. Rep. of Germany ... 8708163[U]

[51] Int. Cl.$^5$ ............................................. F03D 3/02
[52] U.S. Cl. ...................................... 415/4.2; 415/907
[58] Field of Search ................ 415/4.1, 4.2, 4.4, 905, 415/907; 290/55

[56] References Cited

U.S. PATENT DOCUMENTS

| 43,049 | 6/1864 | Trim | 415/4.4 |
|---|---|---|---|
| 177,597 | 5/1876 | Ward | 415/4.2 |
| 4,350,900 | 9/1982 | Baughman | 415/907 |
| 4,415,814 | 11/1983 | Martinez | 415/907 |

FOREIGN PATENT DOCUMENTS

| 57580 | 4/1921 | Belgium | 415/4.2 |
|---|---|---|---|
| 577695 | 9/1924 | France | 415/4.2 |
| 727519 | 6/1932 | France | 415/4.2 |
| 2492897 | 4/1982 | France | 415/4.2 |
| 2530296 | 1/1984 | France . | |
| 7809790 | 3/1980 | Netherlands . | |
| 229740 | 2/1925 | United Kingdom | 415/4.2 |

Primary Examiner—John T. Kwon
Attorney, Agent, or Firm—Michael J. Striker

[57] ABSTRACT

Wind power engine having a rotor (1) which is rotatable about a vertical axis and has at least three rotor blades (A, B, C) arranged substantially radially which subdivide the rotor (1) into equisized sectors. To improve the characteristics and the efficiency of the wind power engine the rotor blades (A, B, C) are vertically subdivided into several sub-blades (3, 4, 5) and between the sub-blades (3, 4, 5) vertical gaps (6) are arranged for the passage of air. In cross-section said sub-blades (3, 4, 5) are dish-shaped or trough-shaped, the end regions of the sub-blades being angles or bent oppositely to the direction of rotation of the rotor through about 30°.

6 Claims, 2 Drawing Sheets

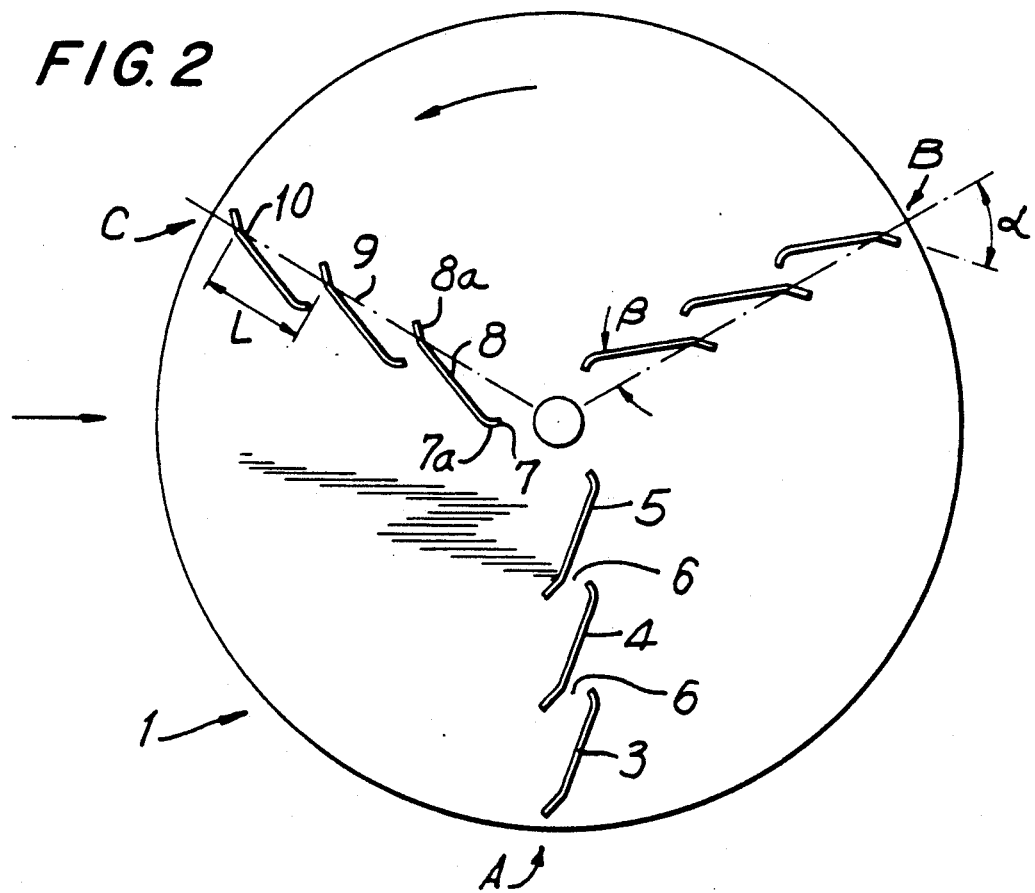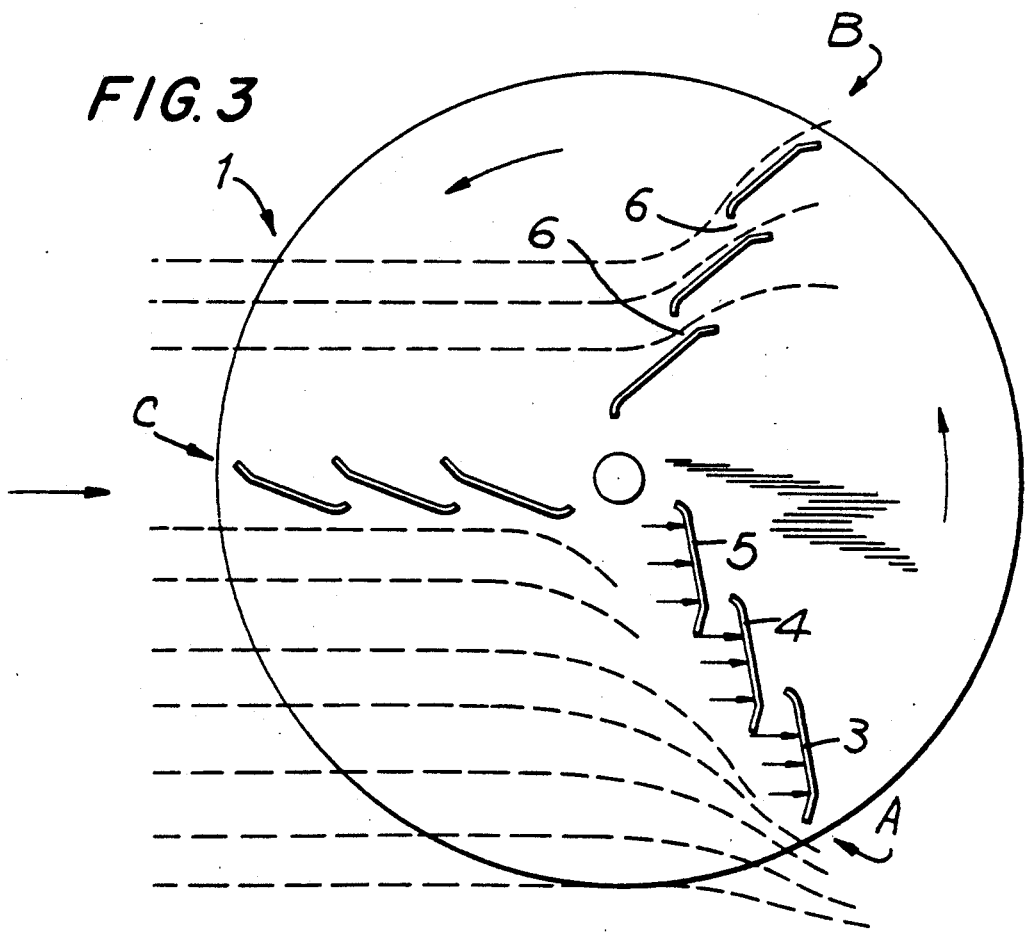

WIND POWER ENGINE

The invention proceeds from a wind power engine having a rotor which is rotatable about a vertical axis and has at least three substantially radially extending rotor blades which subdivide the rotor into three equisized sectors. Wind power engines of this type are known from the German utility model 8,631,273 and 8,600,597. In these known wind power engines the rotor is provided with three or more rotor blades extending substantially radially which are angled in their radially outer edge region approximately 45° against the direction of rotation of the rotor. In the known wind power engines the side of the rotor opposing the wind is covered by a means which is rotatable about the axis of the rotor and is rotated by a wind vane into the wind.

The present invention is based on the problem of simplifying a wind power engine of the type mentioned at the beginning in such a manner that it can be produced economically and a means covering the part of the rotor rotating against the wind is not necessary.

This problem is solved according to the invention in that the rotor blades are vertically subdivided into two or more sub-blades and between adjacent sub-blades vertical gaps for the passage of air are arranged.

The rotor according to the invention has the advantage that the rotor blades in the region rotating against the wind offer a lower resistance than the rotor blades of the known wind power engines.

The sub-blades are bent through approximately 50° in their edge regions oppositely to the direction of rotation of the rotor so that they have a dish-shaped or trough-shaped cross-section.

It has been found that the efficiency of this wind power engine can be improved in that the sub-blades with their essentially planar region do not extend radially but are turned about a perpendicular axis in such a manner that with their radially inner edges in the direction of rotation of the rotor they lie in front of the associated radius and the radially outer edge regions lie behind said associated radius.

Further features of the invention will be apparent from the claims.

Figure 4:
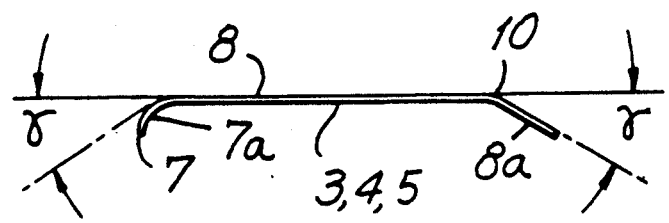

In the following description an example of embodiment of the wind power engine according to the invention will be described in detail with reference to the drawings, wherein:

FIG. 1 is a perspective view of a two-stage wind power engine according to the invention, FIG. 2 is a sectional view of a rotor of the wind power engine according to FIG. 1, FIG. 3 is a sectional view coresponding to FIG. 2 with indicated wind flow path FIG. 4 is a plan view of a sub-blade.

The wind power engine apparent from FIG. 1 comprises a rotor 1 which is mounted rotatably about a vertical axis in a holding means or frame 2. The rotor 1 comprises an upper stage 11 and a lower stage 12. In each rotor stage 11, 12 three rotor blades A, B and C are arranged. The rotor blades A, B and C subdivide each rotor stage 11 and 12 into three equisized sectors. The rotor blades A, B and C of the upper stage 11 are offset through half a sector with respect to the rotor blades A, B and C of the lower stage 12.

Each rotor blade A, B and C is vertically subdivided into three sub-blades 3, 4, 5. As FIG. 2 shows there are vertical slots 6 between the adjacent sub-blades 3 and 4 and 4 and 5 through which air can pass. The sub-blades 3, 4 and 5 do not extend radially with their substantially planar regions 8 but are mounted twisted forwardly about a vertical axis through an angle $\beta$ of about 20° in the direction of rotation.

As FIG. 4 in particular shows the edge regions 7a and 8a of the sub-blades 3, 4 and 5 are angled or rounded through an angle $\gamma$ of about 30° against the direction of rotation so that the sub-blades in plan view have a dish-shaped or trough-shaped form. Through this shape and arrangement of the sub-blades 3, 4 and 5 a separate wind flow outwardly occurs—as FIG. 3 shows—which is visible at the rotor blade B in FIG. 3. As a result, in the region of the rotor 1 turning against the wind the latter is first conducted outwardly via an air cushion past the apparatus and then in a substantially 45° position of the rotor blade to the wind (see FIG. 2, rotor blade C) the wind is already directed to the active side of the rotor 1. Approximately ⅔ of the wind energy acting on the means is thereby utilized. Especially for the starting phase and under high load it is important that the "active" wind flows inwardly through the gaps 6 between adjacent sub-blades 3, 4 and 5 and moves the rotor 1 in the direction of rotation. In the position of about 30° of a rotor blade A with respect to the wind direction the wind can flow through the gaps 6 of the rotor blade A onto the rotor blade B. In the position of about 90° corresponding to rotor blade A in FIG. 2 to about 120° corresponding to rotor blade A in FIG. 3 a wind buildup occurs for a short time; subsequently the wind flows off outwardly and is retarded by the bent radially outer end regions 8a of the sub-blades 3, 4 and 5. Thus the major part of the wind energy can be taken up by the apparatus and supplied to the current generation or the mechanical utilization. Each individual rotor blade A, B, C thus undergoes a flow-buildup-flow phase for the duration of a half revolution on the "active" side. This condition is especially favourable for the starting phase of the apparatus under load and with low wind strengths.

The known Savonius rotor operates in contrast with a short buildup phase (at about 90°).

With high wind velocities, i.e. with high rotational speed of the rotor 1 a rotating surrounding field of wind forms and as a result only a part of the wind power is converted to rotation so that an overspeeding of the rotor 1 is avoided.

This wind power engine can be used for almost all wind strengths and compared with propeller arrangements is independent of the wind direction.

On the basis of the simple construction, the rotor according to the invention can be made with low expenditure and thus economically.

The radially outer end region 8a of each sub-blade 3, 4, 5 occupies in contrast to the associated radius 9 of the rotor blade A, B, C an angle $\alpha$ of 45° to 60°.

The angle $\beta$ between radius and the substantially planar surface 8 of the sub-blades 3, 4, 5 can be 20° to 30°, in particular 25°. The sub-blades 3, 4, 5 are arranged in such a manner that adjacent sub-blades 3, 4 and 4, 5 overlap at the gaps 6 and the gaps 6 become narrower on the active side of the rotor 1 in the direction of the flow.

I claim:

1. A wind power engine comprising a rotor rotatable about a vertical axis and including at least three substantially radially extending blades which divide said rotor into equisized sectors, each of said plurality of rotor blades comprises a plurality of sub-blades separated by gaps for passage of air therethrough, and each of said plurality of sub-blades having radially outer and inner edge portions bent relative to a remaining portion of a respective sub-blade against a direction of rotation at an angle of about 20°-60°.

2. A wind power engine as set forth in claim 1, wherein said sub-blades are of equal size.

3. A wind power engine as set forth in claim 1, wherein each of said blades is turned about the associated radius by an angle of substantially 20°.

4. A wind power engine as set forth in claim 1, wherein the remaining portion of each sub-blade includes a planar portion and a radially inner edge portion, a distance between bent points, at which said radially outer edge portions are connected to respective planar portions, of adjacent sub-blades being substantially equal to a combined length of the planar portion and the radially inner edge portion of a sub-blade.

5. A wind power engine as set forth in claim 1, wherein the remaining portion of each blade comprises a slightly bent planar portion.

6. A wind power engine comprising a rotor rotatable about a vertical axis and including at least three substantially radially extending blades which divide said rotor into equisized sectors, each of said plurality of rotor blades comprising a plurality of sub-blades separated by gaps for passage of air therethrough, and each of said plurality of sub-blades having a radially outer end portion bent relative to a remaining portion of a respective sub-blade against a direction of rotation of said rotor at an angle of about 50°.

* * * * *